(12) United States Patent
Amanullah (10) Patent No.: US 10,611,944 B2
(45) Date of Patent: *Apr. 7, 2020

(54) ACID-SOLUBLE PLUG FORMING RAPIDLY DEHYDRATING LOSS CONTROL SLURRY

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/278,458

(22) Filed: Feb. 18, 2019

(65) Prior Publication Data
US 2019/0177596 A1 Jun. 13, 2019

Related U.S. Application Data

(62) Division of application No. 15/649,242, filed on Jul. 13, 2017, now Pat. No. 10,294,404.
(Continued)

(51) Int. Cl.
C09K 8/10 (2006.01)
C09K 8/035 (2006.01)
(Continued)

(52) U.S. Cl.
CPC ............ *C09K 8/10* (2013.01); *C09K 8/035* (2013.01); *C09K 8/514* (2013.01); *C09K 8/516* (2013.01);
(Continued)

(58) Field of Classification Search
None
See application file for complete search history.

(56) References Cited

U.S. PATENT DOCUMENTS 4,422,948 A 12/1983 Corley et al.
6,016,879 A * 1/2000 Burts, Jr. ............... C09K 8/035
166/295
(Continued)

FOREIGN PATENT DOCUMENTS

WO WO2004013448 A1 2/2004
WO WO2012037600 A1 3/2012
(Continued)

OTHER PUBLICATIONS

Gómez-Vanegas Natalia, Comparison of Process Configurations from Ethanol Production of Empty Fruit Bunch Palm, Department of Chemical Engineering of Antioquia, no date (Year: 2019).*
(Continued)

*Primary Examiner* — Angela M DiTrani Leff
(74) *Attorney, Agent, or Firm* — Bracewell LLP; Constance G. Rhebergen; Brian H. Tompkins (57) ABSTRACT

A rapidly dehydrating lost circulation material (LCM) composition that forms an acid-soluble plug is provided. The LCM composition may include a carrier fluid, an acid-soluble-particulate material, a viscosifier, and date tree rachis fibers. The carrier fluid may be water and the viscosifier may be a cellulosic microfiber. The LCM composition may alter a lost circulation zone by forming an acid-soluble plug in a fracture of the lost circulation zone. The acid-soluble plug may be removed via an acid solution, such as a hydrochloric acid solution. Methods of lost circulation control and manufacture of a rapidly dehydrating LCM are also provided.

5 Claims, 3 Drawing Sheets

Related U.S. Application Data (60) Provisional application No. 62/431,726, filed on Dec. 8, 2016.

(51) Int. Cl.
| | | |
|---|---|---|
| *C09K 8/514* | (2006.01) | |
| *C09K 8/516* | (2006.01) | |
| *E21B 21/00* | (2006.01) | |
| *E21B 33/138* | (2006.01) | |

(52) U.S. Cl.
CPC .......... *E21B 21/003* (2013.01); *E21B 33/138* (2013.01); *C09K 2208/08* (2013.01)

(56) References Cited

U.S. PATENT DOCUMENTS

| | | |
|---|---|---|
| 6,790,812 B2 | 9/2004 | Halliday |
| 8,714,256 B2 | 5/2014 | Cochran |
| 8,720,555 B2 | 5/2014 | Liang et al. |
| 8,776,882 B2 | 7/2014 | Shindgikar |
| 9,133,384 B2 | 9/2015 | Rincon-Torres et al. |
| 9,133,386 B2 | 9/2015 | Kumar et al. |
| 9,410,066 B2 | 8/2016 | Ghassemzadeh |
| 10,023,781 B2 * | 7/2018 | Amanullah .............. C09K 8/03 |
| 2006/0160907 A1 | 7/2006 | Stamp |
| 2010/0230169 A1 | 9/2010 | Pomerleau |
| 2011/0278006 A1 | 11/2011 | Sanders |
| 2016/0108327 A1 | 4/2016 | Pulikkathara et al. |
| 2016/0160106 A1 | 6/2016 | Jamison et al. |
| 2016/0177162 A1 | 6/2016 | Nguyen et al. |
| 2016/0222275 A1 | 8/2016 | Galindo et al. |
| 2017/0166795 A1 * | 6/2017 | Walker .................. E21B 21/003 |

FOREIGN PATENT DOCUMENTS

| | | | |
|---|---|---|---|
| WO | WO-2015142156 A1 * | 9/2015 | .............. C08H 6/00 |
| WO | WO2016019416 A1 | 2/2016 | |
| WO | WO2016172287 A1 | 6/2016 | |

OTHER PUBLICATIONS

Amanullah et al: "Application of an indigenous eco-friendly raw material as fluid loss additive" Journal Of Petroleum Science and Engineering. vol. 139. Dec. 28, 2015 (Dec. 28, 2015). pp. 191-197.
International Search Report and Written Opinion for International Application No. PCT/US2017/065033 (SA5579); Application Date Dec. 7, 2017; Report dated Jan. 31, 2018 (pp. 1-12).
Mahdavi et al.; "Comparison of mechanical properties of date palm fiber-polyethylene composite" 2010, BioResources 5(4); Nov. 2010; pp. 2391-2403.
Wajheeuddin et al: "An Experimental Study on Particle Sizing of Natural Substitutes for Drilling Fluid Applications" Journal of Nature Science and Sustainable Technology. 2014. pp. 259-324.
World of Molecules "Cotton Molecular Structure" available as of Sep. 7, 2018 from the website: https://www.worldofmolecules.com/materials/cotton.htm.
"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

* cited by examiner

ACID-SOLUBLE PLUG FORMING RAPIDLY DEHYDRATING LOSS CONTROL SLURRY

CROSS-REFERENCE TO RELATED APPLICATIONS

This application is a divisional of and claims priority to U.S. Provisional application Ser. No. 15/649,242 filed Jul. 13, 2017, and titled "ACID-SOLUBLE PLUG FORMING RAPIDLY DEHYDRATING LOSS CONTROL SLURRY, which claims priority from U.S. Provisional Application No. 62/431,726 filed Dec. 8, 2016, and titled "ACID-SOLUBLE PLUG FORMING RAPIDLY DEHYDRATING LOSS CONTROL SLURRY," each of which are incorporated by reference in their entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when some or all of the drilling fluid (which may include drilling mud) pumped into a well does not return to the surface. While a de minimis amount of fluid loss is expected, excessive fluid loss is not desirable from a safety, economical, or environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation may also occur due to induced fractures in weak formations. Lost circulation due to induced fractures may occur when the mud weight needed for well control and to maintain wellbore stability exceeds the fracture gradient of the formations. Depleted reservoir formations that have a low fracture gradient may be susceptible to induced loss circulation. Due to the narrow mud weight window for mud used in such formations, drilling of some depleted zones may be difficult without incurring induced loss circulation because the mud weight used to support the formation can easily exceed the fracture resistance of the formation. Induced loss circulation may also occur due to the inability of the drilling mud to remove low and high gravity solids from the wellbore. The accumulation of solids in the mud may increase the fluid density beyond the upper limit of the mud weight window and create induced fractures in the formation.

SUMMARY

Different types of traditional and specially designed loss control materials, slurries, and pills are used to control lost circulation. Loss control materials may generally be classified into several categories, such as surface plastering and shallow plugging materials, fracture sealing and deeper plugging materials (also referred to as "loss control slurries"), and interstitial bridging and pore plugging materials. Such lost circulation materials (LCMs) are used to mitigate the lost circulation by blocking the path of the drilling mud into the formation. The type of LCM used in a lost circulation situation depends on the extent of lost circulation and the type of formation.

Lost circulation may occur in either the non-reservoir and reservoir sections, or both, of a wellbore. Certain LCMs may be more suitable for use in reservoir sections of a reservoir. For example, LCMs that are removable via acid washes that degrade over time or that are oil soluble may be suitable for use in the reservoir sections of a wellbore. Consequently, a smaller number of LCMs are available to combat loss of circulation in the reservoir section of a wellbore.

A challenging situation arises in depleted reservoirs due to the ease of creation of induced loss circulation. Because the mud weight required to support the formation can easily exceeds the fracture gradient of the formation due to narrow mud weight window, the drilling of some depleted zones may be very difficult without incurring induced loss of circulation. As some LCMs may cause permanent damage to depleted oil and gas reservoirs, a non-damaging (for example, acid-soluble, degradable, or oil soluble) LCM may be suitable for combating loss of circulation in depleted oil and gas reservoirs.

Induced loss circulation may also occur in non-depleted reservoirs due to the inability of the drilling mud to remove low and high gravity solids from the wellbore. The accumulation of the solids in the mud may increase the fluid density beyond the upper safe limit of the mud weight window and result in the creation of induced fractures in the reservoir formation, leading to moderate to severe lost circulation. Some LCMs may cause severe damage to the reservoir and result in a drastic loss of well productivity. In such instances, a non-damaging (for example, acid-soluble, degradable, or hydrocarbon soluble) LCM may be more suitable to avoid a severe impact on the productivity of a well and recovery from a reservoir.

Many commercial LCMs, such as loss control pills and slurries are not suitable for controlling loss of circulation encountered in the reservoir section of a borehole due to their detrimental effect on well productivity and the recovery from the reservoir. Moreover, some conventional LCMs and lost circulation pills typically fail when used in moderate to severe fluid loss conditions. Moreover, conventional loss control pills and slurries also lack the ability to seal and block moderate to severe loss zones. Additionally, lost circulation can cause environmental problems if drilling fluids or LCMs interact with the environment surrounding the reservoir. Thus, there is a need for LCMs to overcome the lost circulation related drilling challenges in the pay zone without hampering the productivity of a well and ultimate recovery of a field, especially in moderate to severe loss zones.

Embodiments of the disclosure generally relate to an acid-soluble plug-forming rapidly dehydrating LCM composition (also referred to as a rapidly dehydrating fluid (RDF)) to control lost circulation in a lost circulation zone in a wellbore. More specifically, embodiments of the disclosure relate to a rapidly dehydrating LCM composition that includes a carrier fluid, an acid-soluble particulate material (for example, calcium carbonate), a viscous material (also referred to as a "viscosifier"), and an organic fibrous material (for example, fibers formed from the rachis of date trees).

In one embodiment, a lost circulation material (LCM) composition is provided. The LCM composition includes a carrier fluid, an acid-soluble particulate material, a viscosifier, and a fibrous material that includes date tree rachis fibers. In some embodiments, the carrier fluid, the particulate material, the viscosifier, and the fibrous material form a homogenous mixture. In some embodiments, the carrier fluid comprises water. In some embodiments, the viscosifier includes a cellulosic microfiber. In some embodiments, the acid-soluble particulate material includes calcium carbonate. In some embodiments, the calcium carbonate is at least 4% weight of the total weight (w/w %) of the LCM composition. In some embodiments, the date tree rachis fibers comprise at least 4% weight of the total weight (w/w %) of the LCM composition. In some embodiments, the LCM composition has a dehydration time of less than 3 minutes at 100 pounds-per-square inch differential (psid) pressure.

In another embodiment, a method to control lost circulation in a lost circulation zone in a wellbore. The method includes introducing an altered drilling fluid into the wellbore such that the altered drilling fluid contacts the lost circulation zone and reduces a rate of lost circulation into the lost circulation zone. The altered drilling fluid includes a drilling fluid and a lost circulation material (LCM) composition. The LCM composition includes a carrier fluid, an acid-soluble particulate material, a viscosifier, and a fibrous material that includes date tree rachis fibers. In some embodiments, the method includes introducing an acid solution into the wellbore such the acid solution contacts a plug formed by the LCM composition in the lost circulation zone. In some embodiments, the acid solution includes hydrochloric acid. In some embodiments, the method includes adding the LCM composition to the drilling fluid to create the altered drilling fluid. In some embodiments, the carrier fluid, the particulate material, the viscosifier, and the fibrous material form a homogenous mixture. In some embodiments, the carrier fluid comprises water. In some embodiments, the viscosifier includes a cellulosic microfiber. In some embodiments, the acid-soluble particulate material includes calcium carbonate. In some embodiments, the calcium carbonate is at least 4% weight of the total weight (w/w %) of the LCM composition. In some embodiments, the date tree rachis fibers comprise at least 4% weight of the total weight (w/w %) of the LCM composition. In some embodiments, the LCM composition has a dehydration time of less than 3 minutes at 100 pounds-per-square inch differential (psid) pressure.

In some embodiments, an altered drilling fluid is provided that includes a drilling fluid and a lost circulation material (LCM). The LCM composition includes a carrier fluid, an acid-soluble particulate material, a viscosifier, and a fibrous material that includes date tree rachis fibers. In some embodiments, the carrier fluid comprises water. In some embodiments, the viscosifier includes a cellulosic microfiber. In some embodiments, the acid-soluble particulate material includes calcium carbonate. In some embodiments, the calcium carbonate is at least 4% weight of the total weight (w/w %) of the LCM composition. In some embodiments, the date tree rachis fibers comprise at least 4% weight of the total weight (w/w %) of the LCM composition.

In another embodiment, a method of forming a lost circulation material (LCM) is provided. The method includes adding a carrier fluid to form a mixture and adding an acid-soluble particulate material to the mixture. The method further includes adding viscosifier to the mixture and adding a fibrous material to the mixture, the fibrous material comprising date tree rachis fibers. In some embodiments, the LCM composition comprises a homogenous mixture. In some embodiments, the carrier fluid comprises water. In some embodiments, the viscosifier includes a cellulosic microfiber. In some embodiments, the fibrous material consists of date tree rachis fibers. In some embodiments, the particulate material consists of calcium carbonate.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

The present disclosure includes compositions for use as a lost circulation material (LCM) to mitigate or prevent such lost circulation in a well and prevent or reduce the loss of drilling mud while drilling. The compositions described in this disclosure may create an acid-soluble plug in a fracture of a formation to reduce or prevent the loss of drilling mud into the surrounding formation. In some embodiments, the LCM compositions described in this disclosure can squeeze out all of the fluid phase in a range of about 1.5 minutes to about 3 minutes at about 100 psid (pounds per square inch differential) or more of overbalance pressure. Further, the compositions described in this disclosure are eco-friendly, non-toxic, and environmentally safe such that the use of such compositions for lost circulation control will have little to no detrimental effects on the subsurface environment and surrounding aquifers.

Additionally, the compositions described in this disclosure use raw materials that may be available locally and may encourage economic and job growth of local industries, such as the date farming industry. The compositions described in the disclosure also provide a viable recycling path for date tree waste (that is, portions of the date tree discarded after production of dates). Further, the production of compositions from locally available raw materials may reduce or eliminate the importation of conventional LCMs.

Figure 1:
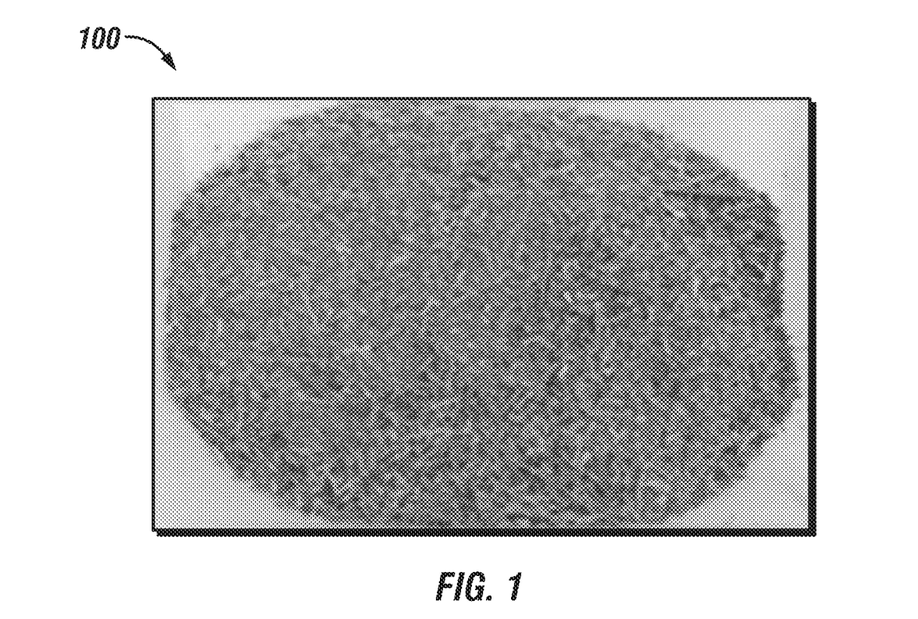
FIG. 1 is a photograph of fibers produced from the date tree waste in accordance with an embodiment of the disclosure.

The present disclosure includes rapidly dehydrating LCM compositions to control lost circulation in a lost circulation zone in a wellbore. In some embodiments, a rapidly dehydrating LCM composition includes a carrier fluid, an acid-soluble particulate material, a viscous material (also referred to as a "viscosifier"), and date tree rachis fibers as a fibrous material. In some embodiments, the rapidly dehydrating LCM composition includes water as the carrier fluid, calcium carbonate as the acid-soluble particulate material, a cellulosic microfiber viscosifier, and fibers produced from date trees (also referred to as "date palms") as the fibrous material. FIG. 1 is a photograph 100 of fibers produced from the date tree waste in accordance with an embodiment of the disclosure. As used in the disclosure, the term date tree waste refers to the waste produced from processing date trees (also referred to as "date palms") in the production of date fruits (also referred to as "dates"). The fibers may include, by way of example, fibers produced from date tree rachis (also referred to as "date tree rachis fibers"). In some embodiments, the LCM composition may form or be referred to as a rapidly dehydrating fluid (RDF).

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure The following non-limiting examples of LCM compositions were prepared and evaluated to determine the rapidity of dehydration, the plug forming capabilities, and the acid solubility potential of the formed plug. Table 1 shows the formulations of the example LCM compositions used in the tests, with compositions of the components provided in milliliters (ml) or grams (g), and also expressed as weight of the total weight (w/w %) of the LCM composition

TABLE 1

LCM formulations for dehydration testing

| | | Amount | |
|---|---|---|---|
| Component | Description | Formulation 1 | Formulation 2 |
| Water (ml) | Carrier Fluid | 350 | 350 |
| Particulate Material (g) | Calcium Carbonate (CaCO$_3$) | 40 (9.5 w/w %) | 20 (4.8 w/w %) |
| Viscosifier (g) | Betafib ® | 15 (4.0 w/w %) | 15 (3.6 w/w %) |
| Fibrous Material (g) | Date Tree Rachis Fibers | 15 (4.0 w/w %) | 30 (7.2 w/w %) |

Formulation 1 used medium grade calcium carbonate particles having a D50 particle size distribution value in the range of about 135 microns to about 165 microns. Formulation 2 used fine grade calcium carbonate particles having a D50 particle size distribution value of about 10 microns to about 14 microns. As shown in Table 1, each formulation included a cellulosic microfiber viscosifier, Betafib®, manufactured by Cosun Biobased Products of Roosendaal, Netherlands. Each formulation also included a fibrous material of rachis fibers obtained from the date tree *phoenix dactylifera*.

The two formulations were tested using the following dehydration test procedure using an American Petroleum Society (API) filter press having a filtration cell to contain the LCM composition undergoing testing:

1. Prepare formulation by mixing each component in a commercial drilling fluid mixer to form a homogenous mixture;
2. Fill filtration cell of API filter press with a 350 cubic centimeter (cc) pill of the formulation;
3. Mount filtration cell to API filter press, affix the upper lid, and connect an air pressure line of nitrogen gas at about 100 psid pressure; and
4. Measure the dehydration time of the pill (that is, the time for the fluid (about 350 cc) to be removed) at room temperature and 100 psid pressure and collect discarded fluid (that is, expelled carrier fluid) in a fluid collection pot at the bottom outlet of the API test cell.

The results of the dehydration test procedure for the tested LCM compositions for both formulations are shown in Table 2, with the dehydration time measured in minutes (min) and the thickness of the plug formed by the dehydrated pill measured in millimeters (mm):

TABLE 2

Dehydration Testing results

| | Formulation 1 | Formulation 2 |
|---|---|---|
| Dehydration time (min) | 3 | 1.55 |
| Plug Thickness (mm) | 43.259 | 44.45 |

Figure 2:
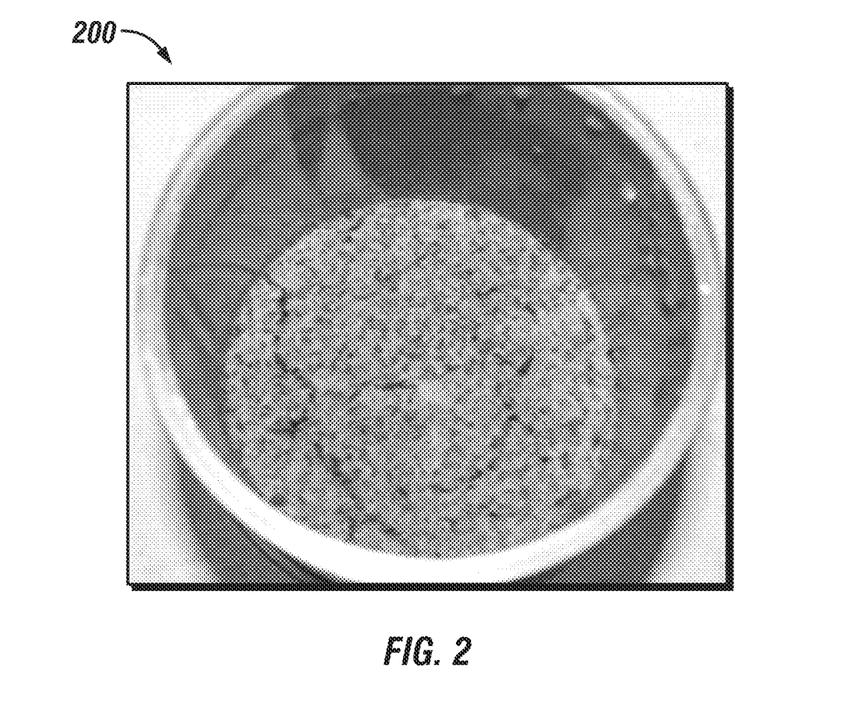
FIG. 2 is a photograph of an acid-soluble plug in a test cell and formed after a dehydration test of an example LCM composition in accordance with an embodiment of the disclosure.

FIG. 2 is a photograph 200 of an acid-soluble plug formed after the dehydration test according to the procedure described supra. As shown in Table 2, for a 350 cc pill in the API filtration cell under 100 psi differential (psid) pressure, each formulation exhibited dehydration time of less than 3 minutes (that is, a solid plug was formed in 3 minutes or less dehydration time under 100 psid pressure). The first formulation exhibited a dehydration time of about 3 minutes, and the second formulation with a lower concentration of acid-soluble particulate and a higher amount of fibrous material exhibited a dehydration time of less than 2 minutes. The variation in dehydration time between each formulation may be dependent on the concentration of acid-soluble particulate material (for example, calcium carbonate), fibrous material (for example, date tree rachis fibers), or both. Each formulation formed acid-soluble plugs having a nearly equal plug thickness, thus indicating similar performance in a potential loss zone. Thus, each of the tested formulations may thus be suitable as a rapidly dehydrating LCM composition to block fractures of different dimensions and reduce or prevent loss of drilling mud in, for example, moderate to severe loss zones of hydrocarbon reservoirs.

Figure 3:
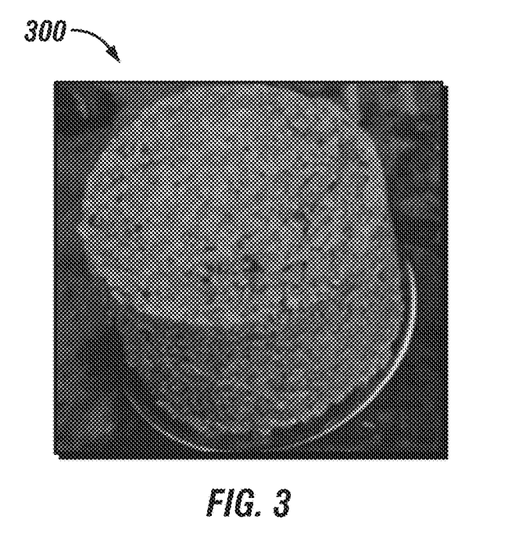
FIGS. 3 and 4 are photographs of acid-soluble plugs and formed by the dehydration test of example LCM compositions in accordance with an embodiment of the disclosure.
Figure 4:
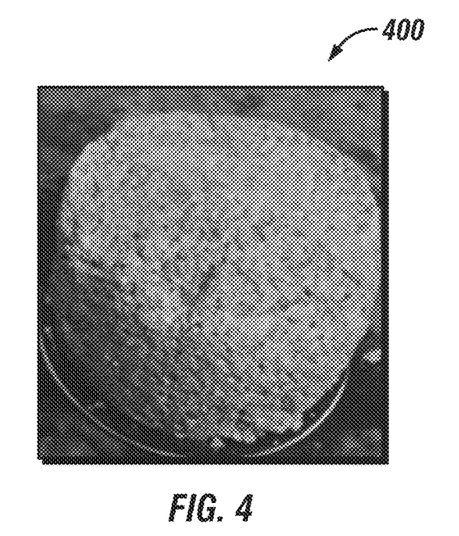

The acid solubility of the plug was evaluated by observing the plug's physical condition and mechanical stability before and after adding a 15 w/w % hydrochloric (HCl) acid solution to the RDF. For example, FIG. 3 is a photograph 300 of the acid-soluble plug formed by the dehydration test of the first formulation of the LCM composition. In another example, FIG. 4 is a photograph 400 of the acid-soluble plug formed by the dehydration test of the second formulation of the LCM composition The acid solubility of the plugs formed by the two formulations was tested using the following test procedure:

1. Transfer the plug formed during the dehydration test to a glass beaker;
2. Pour 15 w/w % hydrochloric acid (HCl) solution in an amount sufficient to completely submerge the plug; and
3. Wait from about 5 minutes to about 8 minutes to dissolve the acid-soluble particulate material of the plug.

Figure 5:
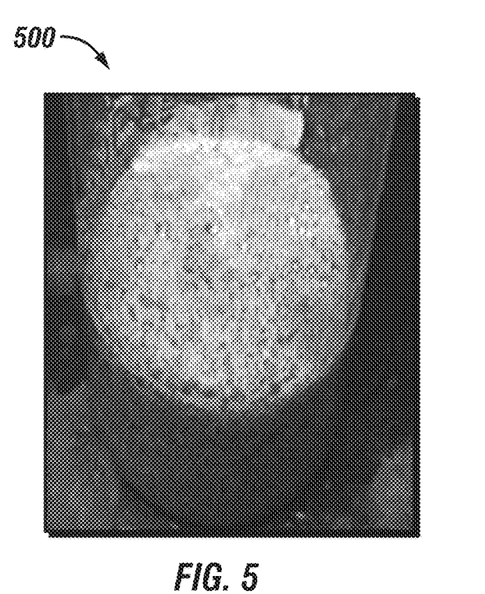
FIG. 5 is a photograph of the initial stage of interaction between a plug formed by an example LCM composition and an acid solution in accordance with an embodiment of the disclosure.
Figure 6:
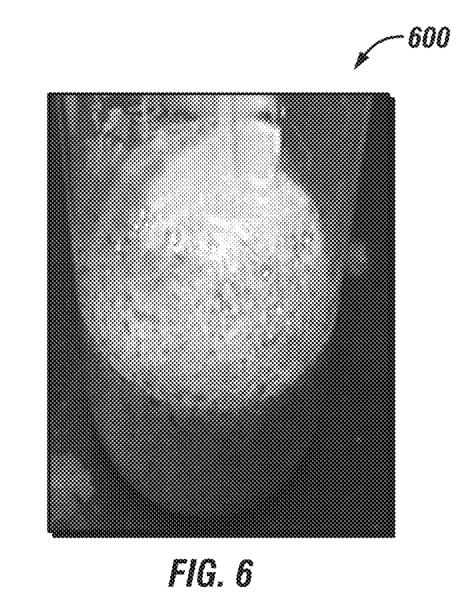
FIG. 6 is a photograph of the final stage of interaction between a plug formed by the an example LCM composition and an acid solution in accordance with an embodiment of the disclosure.

During the dissolution of the acid-soluble particulate material, an increasing volume of foam was generated, followed by a stabilization of and minor changes in foam generation, and then by a progressively decreasing rate of foam generation. For example, FIG. 5 is a photograph 500 of the initial stage of interaction between a plug formed by the test LCM composition and the acid solution, and FIG. 6 is a photograph 600 of the final stage of interaction between a plug formed by the test LCM composition and the acid solution.

As the test procedure was conducted on unconfined plugs, the plugs dispersed completely due to the interaction of the acid and the particular material, resulting in complete dispersion of the fiber network formed by the fibrous materials. The dispersed fibers remained intact due to poor acid solubility. Both formulations demonstrated the formation of acid-soluble plugs that were easily dissolved by an acid (for example, hydrochloric acid). Thus, each of the tested formulations may be usable as a rapidly dehydrating LCM composition that provides for subsequent removal of a plug formed by the composition via an acid wash, such as before completion of the well.

Rapidly Dehydrating LCM Compositions

In some embodiments, a rapidly dehydrating LCM (also referred to as a loss control slurry) may include a carrier fluid, a fibrous material, an acid-soluble particulate material, and a viscosifier. The carrier fluid may include fresh water, seawater, brines or formation fluid. The fibrous material may include a fibrous material derived from date tree waste, such as date tree rachis fibers. The acid-soluble particulate material may include calcium carbonate. The viscosifier may include a suitable commercial viscosifier that can provide for rapid dehydration of the slurry under 100 to 500 psid overbalance pressure. In some embodiments, the fibrous material may include date tree rachis fibers. Example compositions are shown supra in Table 1.

In some embodiments, a rapidly dehydrating LCM composition may include a carrier fluid, an acid-soluble particulate material, a viscosifier, and a date tree rachis fibers. In some embodiments the carrier fluid may include water. For example, the carrier fluid may include freshwater (water having relatively low (that is, less than 5000 ppm) concentrations of total dissolved solids), seawater (for example, water having a salinity in the range of about 33,000 to about 37,000 parts-per-million (ppm)), artificial brines, natural brines, brackish water, or formation water.

In some embodiments, the acid-soluble particulate material of the LCM composition may include calcium carbonate. In some embodiments, the particulate material of the LCM composition may include medium grade calcium carbonate particles having a D50 particle size distribution value in the range of about 135 microns to about 165 microns. In some embodiments, the particulate material of the LCM composition may include fine grade calcium carbonate particles having a D50 particle size distribution value of about 10 microns to about 14 microns. In some embodiments, the particulate material of the LCM composition may include both medium grade and fine grade calcium carbonate particles, or calcium carbonate particles having other sizes. In other embodiments, other acid-soluble particular materials may be used.

In some embodiments, the viscosifier may include a cellulosic microfiber derived from raw vegetable materials. In some embodiments, the viscosifier may have be a non-toxic viscosifier having cellulose in the range of about 5 w/w % to about 25 w/w % and water, and a pH in the range of about 3 to about 6. In some embodiments, the viscosifier may include Betafib® manufactured by Cosun Biobased Products of Roosendaal, Netherlands.

In some embodiments, a rapidly dehydrating LCM composition may include water as a carrier fluid, calcium carbonate as an acid-soluble particulate material, a cellulosic microfiber as a viscosifier, and date tree rachis fibers as a fibrous material. In some embodiments, the calcium carbonate may be in the range of about 4 w/w % to about 10 w/w %. In some embodiments, the date tree rachis fibers may in the range of about 3 w/w % to about 8 w/w %. In some embodiments, when subjected to a squeezing or overbalance pressure, the rapidly dehydrating LCM composition may eliminate all of a fluid phase in 3 minutes or less at about 100 psid overbalance pressure or less than about 2 minutes at 100 psid overbalance pressure.

In some embodiments, when subjected to a squeezing or overbalance pressure, the rapidly dehydrating LCM composition can form an acid-soluble plug in a fracture to prevent or reduce the loss of drilling mud into the surrounding formation. In some embodiments, a rapidly dehydrating LCM composition may have a greater concentration of fibrous material (for example, date tree rachis fibers) to form a plug having a relatively greater thickness, as compared to rapidly dehydrating LCM composition having lesser concentrations of the fibrous material. The acid-soluble plug is dissolvable by an acid, such as hydrochloric acid or other mineral acids. For example, the acid-soluble plug may be dissolved by a 15% hydrochloric acid solution. In other embodiments, other acid solutions may be used to dissolve the acid-soluble plug formed by the rapidly dehydrating LCM composition.

In some embodiments the fibrous material of the LCM composition may include date tree rachis fibers (that is, a material composed of such fibers). The date tree rachis may be obtained from date tree waste, such as produced as a waste by-product from date processing, and the date tree waste may be obtained from date processing plants to provide sustainable source of particulate material. Moreover, local sources of date tree waste may reduce the cost of imported LCM products, components, or both. In some embodiments, the date tree waste may be obtained from the species *phoenix dactylifera*. It should be appreciated that, in some embodiments, the date tree waste may be obtained from genetically modified date trees (that is, genetically modified organisms (GMOs)). In some embodiments, the date tree rachis may be prepared by cleaning the rachis, such as by blowing air over the rachis to remove dust, rubbish, and other material, and then chopping, crushing, and grinding the rachis using an industrial grinder to produce date tree rachis fibers. In some embodiments, the processed fibers may be sifted via a sieve to obtain a desired size of the fibrous material for us in the LCM composition described in the disclosure.

In some embodiments, the date tree rachis fibers may include untreated date tree rachis fibers, thus preserving the environmentally-friendly and biodegradable properties of the manufacturing process, the fibers, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree fibers may be manufactured without treating before, during, or after crushing, grinding, drying, or any other processing.

In some embodiments, a rapidly dehydrating LCM composition may be formed by adding a carrier fluid to a mixture, adding an acid-soluble particulate material (for example, calcium carbonate) to the mixture, adding a viscosifier to the mixture, and adding a fibrous material (for example, rachis fibers of a date tree) to the mixture. In some embodiments, the rapidly dehydrating LCM composition may be formed by first adding the carrier fluid, followed by adding the acid-soluble particulate material (for example, calcium carbonate), followed by adding the viscosifier, and followed by adding a fibrous material (for example, rachis fibers of a date tree). The LCM composition may be formed by mixing the carrier fluid, particulate material, viscosifier, and fibrous material in a high-speed mixer (for example, a commercial drilling fluid mixture) and forming a homogenous mixture, such as a homogenous fluid pill. In some embodiments, the LCM composition may be mixed for a time period (for example, in a range of about 4 minutes to about 5 minutes) after the addition of each component. In some embodiments, the LCM composition may be mixed for another time period (for example, in a range of about 10 minutes to about 15 minutes) after all components have been added to form a homogenous LCM mixture. In some embodiments the rapidly dehydrating LCM composition may be produced without any additives or treatments, thus preserving the environmentally-friendly and biodegradable properties of both the manufacturing process and the rapidly dehydrating LCM composition. In other embodiments, the rapidly dehydrating LCM composition may be mixed or otherwise combined with additives or otherwise treated. In some embodiments, additives may be mixed or otherwise combined with the LCM to change the rheology or pH of the LCM. In some embodiments, such additives may include softening agents, surface active agents (surfactants), viscosity agents, thinning agents, dispersants, coatings (for example, pellet coatings), pH modifiers, insecticides, biocides, or any suitable combination thereof.

Figure 7:
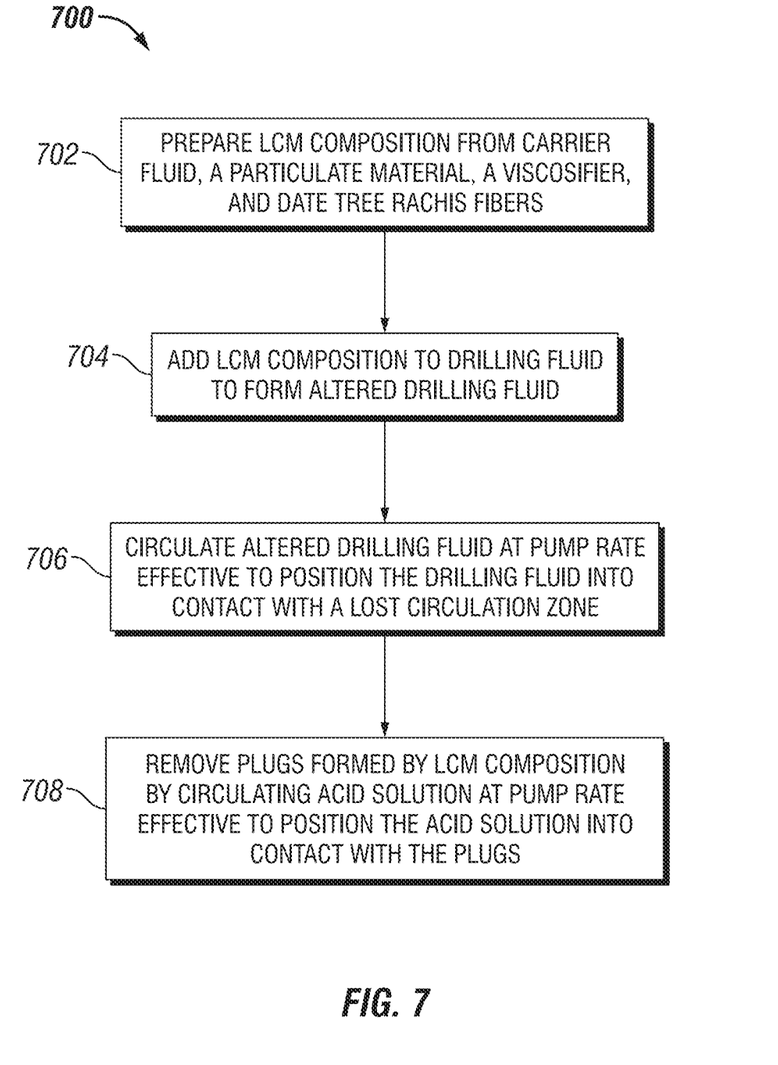
FIG. 7 is a block diagram of a process for the use of a rapidly dehydrating LCM composition in accordance with an embodiment of the disclosure.

FIG. 7 depicts a process 700 for preparing and using a rapidly dehydrating LCM composition in accordance with an embodiment of the disclosure. Initially, the rapidly dehydrating LCM composition may be formed from a carrier fluid, an acid-soluble particulate material, a viscosifier, and date tree rachis fibers (block 702). For example, in some embodiments, the rapidly dehydrating LCM composition may be formed by first adding the carrier fluid, followed by adding the acid-soluble particulate material (for example, calcium carbonate), followed by adding the viscosifier, and followed by adding a fibrous material (for example, rachis fibers of a date tree), and mixing in a high-speed mixer (for example, a commercial drilling fluid mixture) and forming a homogenous mixture. In some embodiments, the LCM composition may be mixed for a time period (for example, in a range of about 4 minutes to about 5 minutes) after the addition of each component and mixed for another time period (for example, in a range of about 10 minutes to about 15 minutes) after all components have been added to form an LCM pill (that is, a fluid pill formed of the LCM composition).

The LCM pill (also referred to an "RDF") may be added to a drilling fluid, such as a drilling mud (block 704). For example, in some embodiments, the LCM pill may be added to (for example, blended with) an oil-based drilling mud or a water-based drilling mud. In some embodiments, an altered drilling fluid may be formed having the LCM pill. In some embodiments, the LCM pill may be added at the mud pit of a mud system. After addition of the LCM pill, the drilling fluid having the LCM pill (that is, an altered drilling fluid) may be circulated at a pump rate effective to position the LCM pill into contact with a lost circulation zone in a wellbore (block 706). Next, a pressure may be applied to form one or more acid-soluble plugs from the LCM pill, such that the rapidly dehydrating LCM composition of the pill alters the lost circulation zone by forming one or more acid-soluble plugs in the porous and permeable paths, cracks, and fractures in a formation in the lost circulation zone. As described supra, for example, in some embodiments the acid-soluble plugs may form in less than 3 minutes at a 100 psid.

Next, the acid-soluble plugs formed by the LCM composition may be removed, such as by circulating an acid solution at a pump rate effective to position the acid solution into contact with the plugs in the lost circulation zone (block 708). For example, in some embodiments a 15 w/w % HCl solution may be circulated to contact the plugs in the lost circulation zone to dissolve and remove the plugs. In other embodiments, other suitable acid solutions (for example, different concentrations of HCl or solutions having other mineral acids such as nitric acid or sulfuric acid) may be used to dissolve and remove the plugs.

After removal of the plugs, further operations on the well (for example, cementing operations) may be performed. As noted in the disclosure, the eco-friendly, non-toxic, and environmentally friendly properties of the rapidly dehydrating LCM composition may minimize or prevent any environmental impact, any effect on ecosystems, habitats, population, crops, and plants surrounding the drilling site where the rapidly dehydrating LCM composition is used.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A lost circulation material (LCM) composition, the composition comprising:
    a carrier fluid;
    calcium carbonate comprising an amount in the range of 4% weight of the total weight (w/w %) of the LCM composition to 9.5 w/w % of the LCM composition;
    a viscosifier; and
    a fibrous material comprising date tree rachis fibers, wherein the date tree rachis fibers comprise an amount in the range of 3 weight of the total weight (w/w %) of the LCM composition to 8 w/w % of the LCM composition,
    wherein the LCM composition has a dehydration time of less than 3 minutes at 100 pounds-per-square inch differential (psid) pressure.

2. The LCM composition of claim 1, wherein the carrier fluid, the particulate material, the viscosifier, and the fibrous material form a homogenous mixture.

3. The LCM composition of claim 1, wherein the carrier fluid comprises water.

4. The LCM composition of claim 1, wherein the viscosifier comprises a cellulosic microfiber.

5. The LCM composition of claim 1, wherein the fibrous material consists of date tree rachis fibers.

* * * * *

UNITED STATES PATENT AND TRADEMARK OFFICE
CERTIFICATE OF CORRECTION

PATENT NO. : 10,611,944 B2  
APPLICATION NO. : 16/278458  
DATED : April 7, 2020  
INVENTOR(S) : Md Amanullah Page 1 of 1

It is certified that error appears in the above-identified patent and that said Letters Patent is hereby corrected as shown below:

On the Title Page

Item (62), Lines 1-2, should read:
(62) Division of application No. 15/649,242, filed on Jul. 13, 2017, now Pat. No. 10,611,943

Signed and Sealed this
Twenty-first Day of July, 2020

Andrei Iancu
*Director of the United States Patent and Trademark Office*